United States Patent
Börger et al.

[11] Patent Number: 5,297,475
[45] Date of Patent: Mar. 29, 1994

[54] MULTI-PURPOSE KITCHEN APPARATUS FOR PROCESSING FOODS

[75] Inventors: Georg Börger, Steinbach; Karl-Heinz Kamprath, Wiesbaden, both of Fed. Rep. of Germany

[73] Assignee: Braun Aktiengesellschaft, Frankfurt, Fed. Rep. of Germany

[21] Appl. No.: 19,759

[22] Filed: Feb. 19, 1993

[30] Foreign Application Priority Data

Feb. 22, 1992 [DE] Fed. Rep. of Germany ....... 4205422

[51] Int. Cl.$^5$ .................. A47J 43/07; A47J 43/046; A47J 43/08; B01F 7/16
[52] U.S. Cl. ..................... 99/348; 99/510; 366/204; 366/314
[58] Field of Search ............... 99/348, 495, 509–513; 366/314, 601, 287, 205, 206, 197, 200; 241/92, 37.5, 282.1, 282.2; 403/26, 300; 277/95, 206 R

[56] References Cited

U.S. PATENT DOCUMENTS

| | | |
|---|---|---|
| 3,774,889 | 11/1973 | Guary .................. 366/314 |
| 3,884,423 | 5/1975 | Wilson ................ 241/282.1 |
| 4,149,271 | 4/1979 | Uibel et al. ........... 366/314 |
| 4,285,473 | 8/1981 | Williams ............... 241/37.5 |
| 4,462,694 | 7/1984 | Ernster et al. ......... 403/26 |
| 4,487,509 | 12/1984 | Boyce .................. 366/206 |
| 4,913,555 | 4/1990 | Maeda et al. .......... 366/205 |
| 4,955,724 | 9/1990 | Otto ................... 277/206 R |
| 5,026,169 | 6/1991 | Titus .................. 366/287 |
| 5,031,518 | 7/1991 | Bordes ................. 99/348 |
| 5,044,763 | 9/1991 | Otto ................... 366/314 |

FOREIGN PATENT DOCUMENTS

| | | |
|---|---|---|
| 1058327 | 5/1959 | Fed. Rep. of Germany . |
| 2258711 | 6/1973 | Fed. Rep. of Germany . |
| 2647455 | 4/1978 | Fed. Rep. of Germany ...... 366/314 |
| 3843703 | 6/1990 | Fed. Rep. of Germany . |
| 1287551 | 8/1962 | France . |
| 2067906 | 8/1981 | United Kingdom . |

Primary Examiner—Timothy F. Simone
Attorney, Agent, or Firm—Fish & Richardson

[57] ABSTRACT

The invention is directed to a multi-purpose kitchen apparatus for processing foods, with a container (1) having arranged in a bore (20) in a container bottom (2) a bearing sleeve (4) in which a tool shaft (5) extending through the container bottom (2, 3) is journalled for rotary movement therein. The one end (35) of the tool shaft (5) is adapted to be connected with a drive motor through a coupling means (7), while the other (23) end is adapted be connected through a coupling member (8) with a processing tool for processing the foodstuffs. The bearing sleeve (4) is secured within the bore (20) of the container bottom (2, 3) by means of at least one resilient intermediate ring (9, 10) radially surrounding the bearing sleeve (4). This results in a bearing arrangement which affords particular ease of manufacture, is stable and has a low noise level.

18 Claims, 1 Drawing Sheet

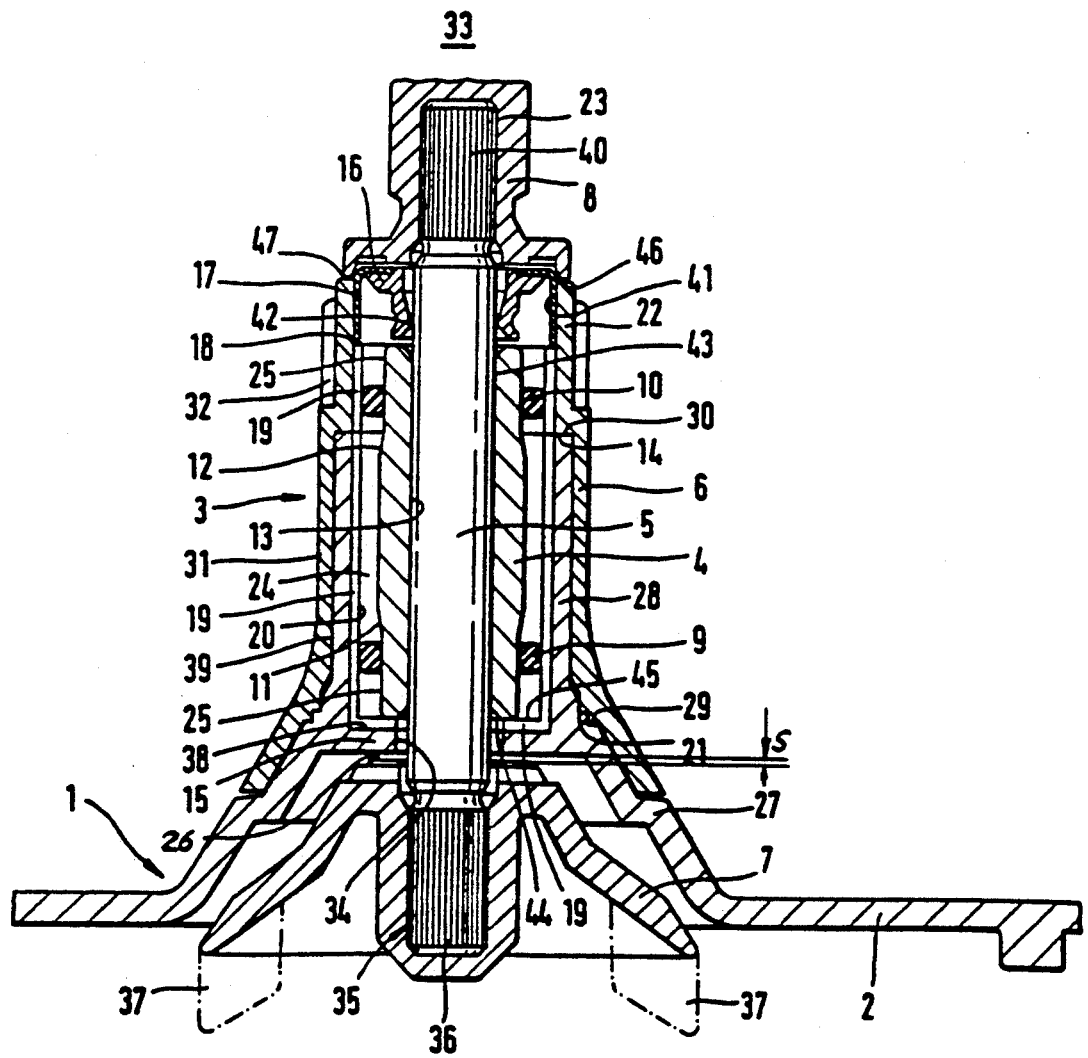

MULTI-PURPOSE KITCHEN APPARATUS FOR PROCESSING FOODS

BACKGROUND OF THE INVENTION

This invention relates to a multi-purpose kitchen apparatus for processing foods, with a container having arranged in a bore in the container bottom a bearing sleeve in which a tool shaft extending through the container bottom is journalled for rotary movement therein, with the one end of the tool shaft being adapted to be connected with a drive motor through a coupling means, while the other end is adapted to receive a processing tool for processing the foodstuffs. Such multi-purpose food processors are employed for blending, mixing, kneading, shredding, chopping, juice extracting, whipping, etc. foods, being frequently usable also as special appliances such as blenders, juice extractors.

A prior art domestic appliance is known from DE-22 58 711 A1. In this prior art structure, for mounting the tool shaft the bearing sleeve receiving the tool shaft is a press fit within the container bottom which is made of a plastic material. In the operation of such a kitchen appliance, a substantial quantity of heat is generated by friction occurring between the tool shaft and the bearing sleeve, which may result in major deformations in the bottom area of the container, thus involving the risk of leakage. To overcome these thermal problems, the known kitchen appliance provides a tool shaft made from a special material of a particularly high thermal conductivity, which has additionally a chromized coating of a particularly low peak-to-valley roughness. It will be obvious that this necessitates very high material and manufacturing expenditure.

It is a further disadvantage of the known kitchen appliance that all vibrations of the tool shaft are directly transmitted into the container through the bearing sleeve, resulting in considerable noise, all the more so since the container acts as an excellent resonant cavity for the shaft vibration transmitted by structure-borne noise. Also, the two-part construction of container and bottom portion with the bearing arrangement results in a highly complex structure involving high cost.

SUMMARY OF THE INVENTION

It is therefore an object of the present invention to provide a multi-purpose food processor according to the prior art which, while affording particular economy of manufacture, is free from thermal problems and the attendant shortcomings. It is another object to configure the bearing for the tool shaft such as to forestall the development of undesirable noise.

According to the present invention, these requirements are satisfied in that the bearing sleeve is secured within the bore of the container bottom by means of at least one resilient intermediate ring radially surrounding the bearing sleeve. This solution has the advantage that bending moments applied as by canting are spring-cushioned, and peak stresses are reduced. Further, the bearing sleeve affords ease of assembly, prevents the transmission of vibrations to the container and has a low noise level.

Whereas known kitchen appliances use glass or plastic containers with integrally formed heat-conducting areas to avoid thermal problems in the region of the tool shaft bearing, an embodiment of the present invention is characterized in that the container, including bottom and dome in which the bearing arrangement is provided, is entirely made of plastic material.

In a further feature of the present invention affording a particularly stable structure, the bearing sleeve is arranged within an annular dome providing the bore. In addition, this permits a simple and safe assembly. The dome which projects upwardly from the container bottom in a particularly central fashion affords the added advantage of exposing the tool shaft or the bearing to minimum possible contamination only. Also, the installation of the tool on the tool shaft is facilitated. The dome permits a long guideway for the bearing sleeve, enabling the high bending moments transmitted to the tool shaft during a kneading operation to be taken up in the container without problems, the container being in turn firmly mountable on the base of the multi-purpose food processor. The cushioning effect of the resilient intermediate ring avoids sudden impact loads.

To avoid undesirable noise caused by the transmission of tool shaft vibrations to the container, a preferred embodiment of the invention, rather than providing for direct contact between the bearing sleeve and the container, allows only an indirect contact through the resilient rubber or plastic cushion. To this effect, it is advantageous to provide an annular chamber extending over the entire length of the bearing sleeve between the bearing sleeve and the bore, with the resilient intermediate ring being tensioned between the outer surface of the bearing sleeve and the bore.

A particularly simple and low-cost construction using conventional standard components is obtained if the resilient intermediate ring is formed by two O-rings. The O-rings afford particular ease and speed of assembly within the bore, and the bearing sleeve is subsequently mounted thereon under radial tension. While securing the resilient rings in their proper location, their assembly may be facilitated at the same time by providing a conically diverging section each on the outer end surfaces of the bearing sleeve. However, it can also be considered that the inside wall of the dome includes for each O-ring at least one conically tapering section against which the O-ring abuts. It will be understood that for axially securing an O-ring not only these limit stops but also other abutments such as steps may be contemplated.

To keep the shaft bearing free from contamination, an embodiment of the invention provides a sealing means, in particular a rotary shaft lip seal, between the tool shaft and the free end of the dome on its inside wall.

In a further aspect of the present invention, the inside wall and/or the bearing sleeve are provided with several circumferentially spaced grooves at least in the area in which they make contact with the resilient intermediate ring. In this arrangement, the channels thereby formed may be in communication with the ambience by means of an orifice. The channels provide a particularly large cooling area consequently carrying off the heat well from the area encompassing the bearing. In addition, humidity which has entered this area during cleaning the container is allowed to drain quickly.

The bearing sleeve is preferably made of sintered bronze in order to utilize the self-lubricating and anti-seizure properties of this material.

To maintain the bearing free from axial thrust during operation of the multi-purpose food processor, it is suggested in a further feature of the present invention to secure the first coupling member to the tool shaft, preferably by shrinking it thereon, and to provide the first coupling member with an annular surface serving as a stop abutting against an end surface formed at the free end. In this arrangement, the tool shaft slidably and rotatably received within the bearing sleeve bears at all times against the dome through the first coupling member.

To secure the tool shaft also in axial direction upwardly, it is suggested to secure the coupling means to the tool shaft, preferably by shrinking it thereon, and to provide on the dome a collar serving as a stop which cooperates with an abutment stop provided on the coupling means such that a clearance (s) exists between the stops with the container seated in place.

A particularly favorable assembly of the bearing may be accomplished by constructing the dome of a tubular section integrally formed with the bottom of a carrying sleeve installed on the tubular section, accordingly being made of two parts. This permits the possibility of prior assemblage of specific components to be utilized. Owing to the two-part configuration of the dome, a material different from that of the carrying sleeve may be selected for the container with its tubular section. This enables the carrying sleeve to be manufactured from a material of higher strength serving an additional stiffening function for the tubular section following its installation on the tubular section. Further, the carrying sleeve may be made of a non-transparent material, whereas the container with its tubular section is translucent. In this arrangement, the carrying sleeve serves as an appearance cover for the dome so that the inner components as the O-rings, the bearing sleeve and the grooves are not visible when looking down onto the container.

Still further, it is advantageous that the carrying sleeve extends approximately up to the base of the dome and that the free end of the carrying sleeve constitutes an extension of the tubular section and is provided with a bore section extending concentrically with the bore. Because the free end of the carrying sleeve adjoins the tubular section, the dome is extended towards the container interior, as a result of which the space requirements of the bearing arrangement may be extended as desired by fitting a correspondingly longer carrying sleeve. This is an advantage particularly when it is desired to use identical containers yet with different bearing arrangements which are required to transmit higher or lower bearing forces, depending on the application. This enables carrying sleeves of different lengths with tool shafts and bearing sleeves of different lengths to be fitted to identical containers, with the added effect of an increased bearing strength being obtained because of the increased relative distance of the two O-rings, that is, in the use of tools required to process particularly heavy doughs as for loaves, the higher bending moments are taken up more easily because the bearing arrangement is built to larger dimensions.

In order to be able to determine the relative distance of the two O-rings independently of the length of the tubular section, the upper O-ring advantageously bears against the bore section of the free end of the carrying sleeve. This enables the upper O-ring to be supported in the carrying sleeve when this becomes necessary due to the transverse forces resulting on the tool shaft during processing of the foods.

A safe support of the carrying sleeve on the tubular section is accomplished by providing the carrying sleeve with shoulders abutting against respective steps formed on the tubular section. A particularly intimate and firm connection between the carrying sleeve and the tubular section is accomplished by connecting the shoulders with the steps by adhesive bonding, friction welding, or ultrasonic welding. The friction welding method results in a particularly intimate connection between the carrying sleeve and the tubular section, providing the dome with a strength nearly equalling the strength obtainable if the dome were integrally made with the container from a single molding.

Advantageously, the outer surface of the carrying sleeve is provided with slots extending longitudinally of the tool shaft and suitable for engagement with a processing tool seatable on the coupling member. However, supporting the processing tool on the carrying sleeve is only necessary with processing tools provided with a gearing as is the case, for example, with the dough hook described in German Patent No. P 37 18 161.

Further advantages as well as the function of the present invention will become apparent from the subsequent description of an embodiment, reference being had to a sole drawing.

BRIEF DESCRIPTION OF THE DRAWINGS

The sole Figure of the drawing is a partial sectional view of the center of a container of the invention suitable for use in a multi-purpose food processor.

DESCRIPTION OF THE PREFERRED EMBODIMENT(S)

The Figure illustrates the container 1 which is preferably a translucent plastic molding. Formed in the container bottom 2 is a centrally located annular tubular section 28 extending up into the interior of the container 1 and having on its inside wall 20 at the lower end thereof an annular collar 15. The annular collar 15 terminates at a bore 34 through which the tool shaft 5 extends outwardly, that is, in downward direction. The end 35 of the shaft 5 is provided with an elongated toothed portion 36 on which a first coupling means 7 is shrunk in a manner preventing relative rotation. The first coupling means 7 includes downwardly extending engaging cams 37 for making an engagement, in a non-rotating relationship, with a further coupling means (not shown) of the drive shaft of the multi-purpose food processor on placing the container 1 onto a base (not shown) of a multi-purpose food processor.

The tubular section 28 has on its inside wall 20 grooves 19 which extend longitudinally of the tool shaft 5 and are also provided on the surface 38 of the annular stop configured as an annular collar 15 on the side facing the inside wall 20. The free end of the tubular section 28 has a step 30 serving as an abutment surface for an annular shoulder 14 provided on a carrying sleeve 6. The cylindrical outer surface 39 of the tubular section 28 is surrounded by the carrying sleeve 6 which has its shoulders 14 and 21 firmly connected with the correspondingly formed steps 30, 29 on the tubular section 28 as by friction welding, adhesive bonding or ultrasonic welding. Accordingly, the tubular section 28, in combination with the carrying sleeve 6 welded thereon, forms the actual dome 3 of the container 1.

Adjoining the upper step 30, the carrying sleeve 6 continues in a portion forming the free end 22 of the dome 3 and extending concentrically with the tubular section 28. The free end 22, too, includes a bore which, in combination with the bore in the tubular section 28, forms the actual bore 20 of the dome 3. Accordingly, the grooves 19 also extend into the bore section of the free end 22 and are provided with identical dimensions.

The carrying sleeve 6 which serves as an appearance cover for the bearing arrangement illustrated herein is made of a non-transparent material, preferably plastic, its color matching the housing of the multi-purpose food processor.

At its free end 22, the outer surface 31 of the carrying sleeve 6 is provided with longitudinally extending slots 32 serving to receive a processing tool (not shown) in a non-rotating relationship in cases where it is provided with a gearing. While the housing of the processing tool is accordingly supported within the slots 32, the drive shaft of the processing tool (not shown) bears against a coupling member 8 shrunk on or otherwise secured to the upper end 23 of the tool shaft 5 in a manner preventing relative rotation by means of an elongated toothed portion 40.

In a manner known per se, the tool shaft 5, being life-time lubricated, is journalled for rotary movement within the bearing sleeve 4 which is preferably made of sintered bronze. The bearing sleeve 4 in turn is radially biased within the tubular section 28 (lower bearing) by means of two O-rings 9, 10 surrounding the bearing sleeve radially, while being resiliently yet fixedly located in the carrying sleeve 6 (upper bearing).

To this end, the bearing sleeve 4 has on its outer surface a lower and an upper conically tapering section 11 and, respectively 12 onto which the lower O-ring 9 and, respectively, the upper O-ring 10 are slid. The conical form described prevents an axial displacement of the bearing sleeve 4 while at the same time affording greater ease of assembly. While the lower O-ring 9 is pressed in between the lower outer surface 25 of the bearing sleeve 4 and the bore 20 of the dome 3, the upper O-ring 10 is pressed in between the upper outer surface 25 of the bearing sleeve 4 and the inside wall of the upper free end 22 of the carrying sleeve 6., thus causing the carrying sleeve 6 and thus the tool shaft 5 to be resiliently centered on the dome 3 in the container 1. The free end 22 terminates at the shoulder 14 of enlarged diameter serving as an abutment surface for the annular end of the step 30 of the tubular section 28. The bearing arrangement described provides no direct contact between the bearing sleeve 4 and the dome 3 or the carrying sleeve 6, only an indirect connection by way of the O-rings 9 and 10.

A rotary shaft lip seal 16 is pressed in the terminal bore 41 at the upper free end 22 of the carrying sleeve 6, its sealing lip 42 being in sliding and sealing engagement with the outer surface 43 of the tool shaft 5.

The rotary shaft lip seal 16 adjoins with its case 17 a step 18 formed at the end of the grooves 19. An upward displacement of the tool shaft 5, when viewing the drawing, is stopped by abutment of the coupling means 7 against the collar 15 through its stop 26. Under normal operating conditions, a clearance s exists between the stops 15 and 26, because the tool shaft 5 bears against the end surface 47 of the upper free end 22 of the carrying sleeve 6 through the annular surface 46 provided on the first coupling member 8. The annular surface 44 of the bearing sleeve 4 abuts against the individual end surfaces 45 formed by the grooves 19. However, a clearance may also exist between the annular surface 44 and the annular collar 15, because the bearing sleeve 4 is anyway fixedly located in axial direction in the dome 3 by the O-rings 9, 10.

The grooves 19 provided on the inside wall 20 of the free end 22 and the tubular section 28, while increasing the contact forces of the pressure connection by increased compressive load per unit area, improve at the same time the cooling action owing to a large surface area, consequently increasing the dissipation of heat as well as water from the bearing area. For one thing, the annular chamber 24 between the bearing sleeve 4 and the grooves 19 is increased, and for another thing, the grooves 19 form through channels allowing humidity which has entered the annular chamber 24,, that is, reached the bearing, to be drained through the annular bore 34 provided between the tool shaft 5 and the collar 15 through which it has entered. It will be understood that the bore 34 could also be equipped with a rotary shaft lip seal of the type identified by reference numeral 16 at the upper end of the bearing, but considering that such containers 1 are also placed in dishwashers for cleaning, this would result in the disadvantage that water would almost inevitably enter the annular chamber 24 after several washing cycles without being allowed to drain. Accordingly, the bore 34 provides an inlet and outlet which, while permitting splash water only under increased pressure to enter the bearing during the washing cycle, enables this splash water to be drained from the bearing area just as rapidly, allowing the bearing to dry.

The two-part configuration of the dome 3 comprising the tubular section 28 and the carrying sleeve 6 seated thereon provides a stable and flexurally strong bearing structure. With its free end 22 extending the length of the tubular section 28, the carrying sleeve 6 is cemented or welded to the tubular section 28 so firmly that the dome 3 provides a stable and firm unit with the bottom 2 of the container 1. The carrying sleeve 6 makes it possible to extend the dome 3 to any desired length in the direction of the container interior 33, so that the bearing assembly may be constructed to a correspondingly longer or shorter length, depending on the magnitude of bearing loads to which it is exposed.

Thus it can be considered that the bearing arrangement requires no carrying sleeve 6 if the same container, yet with lower bearing loads, is to be used. In this instance, the upper O-ring 10 is inserted in the inside wall 20 of the tubular section 28 itself, and the rotary shaft lip seal 16 lies adjacent to the O-ring 10 in the upper end of the inside wall 20 of the tubular section 28. It will be understood, of course, that in this arrangement the selected lengths of the bearing sleeve 4 and the tool shaft 5 are substantially shorter, with the result that only reduced transverse forces may act on this bearing arrangement. While the configuration of the container 1 with its tubular section 28 remains unchanged, the carrying sleeve 6 thus allows the use of longer bearings.

The assembly is performed as follows:

Where a carrying sleeve 6 is used, it is firmly connected with the tubular section 28 as by ultrasonic welding, adhesive bonding or similar fastening methods prior to assemblage of the bearing arrangement 4, 5, 9, 10, 16. Subsequently, the lower O-ring 9 is inserted into the inside wall 20 of the tubular section 28, and the bearing sleeve 4 is fitted to the O-ring 9 with its outer surface 25, until its annular surface 44 abuts the end surface 45 of the collar 15. Because of the conical section 11 provided on the bearing sleeve 4, the O-ring 9 must lie below this conical section 11 when viewing the drawing, since this section acts on the O-ring 9 in the manner of a step on insertion of the bearing sleeve 4.

The next step involves sliding the upper O-ring 10 onto the bearing sleeve 4 with the aid of an annular tool, until it assumes the position shown in the Figure, that is, until its movement is stopped by the conical section 12. Then the rotary shaft lip seal 16 is inserted in the bore 41.

As a subsequent step, the tool shaft 5 provided with the coupling means 7 in a prior operation is already installed is introduced into the bore 13 from below when viewing the drawing, until the elongated toothed portion 40 is in the position illustrated in the drawing. In a last operation, the coupling member 8 is finally shrunk on the elongated toothed portion 40, causing the annular surface 46 provided on the coupling member 8 to abut the end surface 47 provided at the free end 22 of the carrying sleeve 6, thus producing a clearance s between the stops 15, 26. This thus secures the tool shaft 5 relative to the dome 3 in both axial and downward and upward direction. The bearing sleeve 4 is located in the position illustrated in the Figure by the O-rings 9, 10 pressed into the space between the bearing sleeve 4 and the inside wall 20.

On placing the container 1 onto the drive unit, not shown in the drawing, of a multi-purpose food processor, the engaging cams 37 of the coupling means 7 will engage the mating coupling means formed on the drive shaft. At the same time, the bottom 2 of the container 1 will bear against the base of the multi-purpose food processor, the given dimensions thus preventing the transmission of axial thrust to the coupling means 7. If a tool, not shown in the drawing, for processing foods is then installed on the coupling member 8 and the multi-purpose food processor is turned on, the tool shaft 5 will be rotated through the coupling means 7. Because the coupling member 8 is coupled to the tool shaft 5 in a non-rotating relationship and to the processing tool, not shown, in an equally non-rotating relationship, the processing tool will rotate, mixing, kneading or processing in some other way the foodstuffs contained in or loaded into the container 1. Where necessary, any axial thrust acting from the processing tool on the coupling means in downward direction when viewing the drawing will be transmitted through the annular surface 46 to the end surface 47 of the carrying sleeve 6, whereas radial forces will be transmitted resiliently through the O-rings 9, 10 to the dome 3 and from there through the bottom 2 to the container 1 which in turn takes support upon an appliance base, not shown, of the multi-purpose food processor.

We claim:

1. A multi-purpose kitchen apparatus for processing foods, said kitchen apparatus to be used with a drive motor including a drive shaft, said kitchen apparatus comprising:
   a container having a bottom with a bore located therein;
   a journal bearing sleeve arranged within said bore;
   at least one resilient intermediate ring radially surrounding, biasing and thereby securing said journal bearing sleeve within said bore;
   a tool shaft journalled within said journal bearing sleeve for rotary movement therein, said tool shaft extending through the container bottom and having a first end and an opposing second end;
   a first coupling member attached to the first end of said tool shaft, said first coupling member for coupling said tool shaft to the drive shaft of the motor; and
   a second coupling member attached to the second end of said tool shaft, said second coupling member for coupling said tool shaft to a processing element for processing the foods.

2. The multi-purpose kitchen apparatus as claimed in claim 1, wherein the container including the container bottom in which the bore is provided is integrally formed of plastic material.

3. The multi-purpose kitchen apparatus as claimed in claim 1, wherein said container bottom comprises an annular dome which forms said bore and wherein the journal bearing sleeve is carried within said annular dome.

4. The multi-purpose kitchen apparatus as claimed in claim 1, wherein the journal bearing sleeve and said bore form an annular chamber extending over the entire length of the journal bearing sleeve, the resilient intermediate ring being being tensioned between the outer surface and the bore.

5. The multi-purpose kitchen apparatus as claimed in claim 4, comprising two resilient intermediate rings each of which is an O-ring.

6. The multi-purpose kitchen apparatus as claimed in claim 5, wherein an outer surface of the journal bearing sleeve includes two conically diverging sections located between the two O-rings on the journal bearing sleeve.

7. The multi-purpose kitchen apparatus as claimed in claim 5, wherein an inside wall of the dome has for each O-ring at least one conically tapering section.

8. The multi-purpose kitchen apparatus as claimed in claim 1, further comprising a rotary shaft lip seal provided between the tool shaft and a free end of the dome on its inside wall.

9. The multi-purpose kitchen apparatus as claimed in claim 1, wherein the inside wall and/or the journal bearing sleeve are provided with circumferentially spaced grooves in the area in which they make contact with the resilient intermediate rings.

10. The multi-purpose kitchen apparatus as claimed in claim 1, wherein the journal bearing sleeve is made of sintered bronze.

11. The multi-purpose kitchen apparatus as claimed in claim 3, wherein the second coupling member is secured to the tool shaft, preferably by shrinking it thereon, and is provided with an annular surface serving as a stop abutting against an end surface formed at the free end of the dome.

12. The multi-purpose food processor as claimed in claim 2, further comprising a collar on said dome serving as a stop, and wherein the first coupling member includes an abutment stop and is secured to the tool shaft, preferably by shrinking it thereon, and wherein said collar cooperates with said abutment stop on the first coupling member such that a clearance exists between the stop and the abutment stop with the container seated in place.

13. The multi-purpose food processor as claimed in claim 12, wherein the dome comprises a tubular section integrally formed with the bottom and a carrying sleeve installed on the tubular section.

14. The multi-purpose food processor as claimed in claim 13, wherein the carrying sleeve extends approximately up to the base of the dome, and the free end of the carrying sleeve constitutes an extension of the tubular section and is provided with a bore section extending concentrically with the bore.

15. The multi-purpose kitchen apparatus as claimed in claim 13, wherein one of said O-rings bears against the bore section of the free end of the carrying sleeve.

16. The multi-purpose kitchen apparatus as claimed in claim 13, wherein the carrying sleeve is provided with shoulders abutting against respective steps formed on the tubular section.

17. The multi-purpose kitchen apparatus as claimed in claim 15, wherein the shoulders are connected with the steps by adhesive bonding or friction welding.

18. The multi-purpose kitchen apparatus as claimed in claim 13, wherein the outer surface of the carrying sleeve is provided with slots extending longitudinally of the tool shaft and suitable for engagement with a processing tool seatable on the second coupling member.

* * * * *